United States Patent
Koide et al.

(10) Patent No.: US 10,062,161 B2
(45) Date of Patent: Aug. 28, 2018

(54) ENDOSCOPIC IMAGE DIAGNOSIS SUPPORT SYSTEM FOR COMPUTING AVERAGE VALUES OF IDENTIFICATION PROBABILITIES OF PATHOLOGICAL TYPES

(71) Applicant: HIROSHIMA UNIVERSITY, Higashi-Hiroshima-shi, Hiroshima (JP)

(72) Inventors: Tetsushi Koide, Hiroshima (JP); HoangAnh Tuan, Hiroshima (JP); Shigeto Yoshida, Hiroshima (JP); Tsubasa Mishima, Hiroshima (JP); Satoshi Shigemi, Hiroshima (JP); Toru Tamaki, Hiroshima (JP); Tsubasa Hirakawa, Hiroshima (JP); Rie Miyaki, Hiroshima (JP); Kouki Sugi, Hiroshima (JP)

(73) Assignee: HIROSHIMA UNIVERSITY, Hiroshima (JP)

( * ) Notice: Subject to any disclaimer, the term of this patent is extended or adjusted under 35 U.S.C. 154(b) by 0 days.

(21) Appl. No.: 15/117,194

(22) PCT Filed: Feb. 2, 2015

(86) PCT No.: PCT/JP2015/000448
§ 371 (c)(1),
(2) Date: Aug. 6, 2016

(87) PCT Pub. No.: WO2015/118850
PCT Pub. Date: Aug. 13, 2015

(65) Prior Publication Data
US 2016/0350912 A1 Dec. 1, 2016

(30) Foreign Application Priority Data
Feb. 7, 2014 (JP) .................................. 2014-022425

(51) Int. Cl.
*G06K 9/00* (2006.01)
*G06T 7/00* (2017.01)
*G02B 23/24* (2006.01)

(52) U.S. Cl.
CPC ........ *G06T 7/0012* (2013.01); *G02B 23/2484* (2013.01); *G06T 2207/10068* (2013.01)

(58) Field of Classification Search
None
See application file for complete search history.

(56) References Cited

U.S. PATENT DOCUMENTS

| 8,787,636 B2 | 7/2014 | Marugame |
| 9,031,305 B2 | 5/2015 | Nakamura |

(Continued)

FOREIGN PATENT DOCUMENTS

| JP | 2002-165757 A | 6/2002 |
| JP | 2010-203949 A | 9/2010 |
| WO | 2012/111236 A1 | 8/2012 |

OTHER PUBLICATIONS

T. Mishima et al. "The Real-time Feature Extraction Architecture for Colorectal Endoscopic Images with NBI Magnification" (Nov. 1, 2013), vol. 113. No. 282, pp. 25-30. English counterpart: "FPGA Implementation of Feature Extraction for Colorectal Endoscopic Images with NBI Magnification."

(Continued)

*Primary Examiner* — Tahmina Ansari
(74) *Attorney, Agent, or Firm* — Maschoff Brennan

(57) ABSTRACT

An endoscopic image diagnosis support system (100) includes: a memory (10) that stores learning images pre-classified into pathological types; and a processor (20) that, given an endoscopic image, performs feature value matching between an image of an identification target region in the endoscopic image and the learning images, to identify the pathological types in the identification target region. The (Continued)

processor (20) performs feature value matching between images of the identification target region and subdivided regions of the identification target region and the learning images to compute identification probabilities of the pathological types in the identification target region and the subdivided regions, and computes average values of the identification probabilities of the pathological types in the identification target region and the subdivided regions, the average values corresponding to identification probabilities of the pathological types in hierarchical overlap regions of the identification target region and the subdivided regions.

20 Claims, 8 Drawing Sheets

(56) References Cited

U.S. PATENT DOCUMENTS

| | | | | |
|---|---|---|---|---|
| 2011/0191283 | A1* | 8/2011 | Voigt | G06N 5/00 706/54 |
| 2012/0184845 | A1* | 7/2012 | Ishikawa | A61B 3/102 600/425 |
| 2014/0314292 | A1* | 10/2014 | Kamen | A61B 6/463 382/131 |
| 2016/0350912 | A1* | 12/2016 | Koide | G02B 23/2484 |
| 2017/0046839 | A1* | 2/2017 | Paik | G06K 9/00147 |

OTHER PUBLICATIONS

Testushi Koide et al. "Suppoort Vector Machine o Mochiita Pyramidgata Shikibetsuki ni yoru Daicho NBI kakudai Naishikyo Gazo no Ryoiki Bunkatsu" (Jun. 11, 2014), pp. IS3-12-1 to IS3-12-7. English counterpart: "Image Segmentation of Pyramid Style Identifier based on Support Vector Machine for Colorectal Endoscopic Images."

T. Mishima et al. "Development of feature extraction architecture for computer-aided diagnosis system for colorectal endoscopic images with nbi magnification," The 15th IEEE Hiroshima Student Symposium (HISS), Nov. 16, 2013, p. B84-1-B84-4.

S. Shigemi et al. "Development of type identification architecture for computer-aided diagnosis system for colorectal endoscopic images with nbi magnification," The 15th IEEE Hiroshima Student Symposium (HISS), Nov. 16, 2013, p. B79-1-B79-4.

Naoki Iwaoka, "Daicho NBI Naishikyo Gazo no Polyp Ryoiki Bunkatsu no Tameno Keisan Cost to Ninshikiritsu no Hyoka," Dai 17 Kai Symposium on Sensing via Image Information Koen Ronbunshu, Jun. 8, 2011, pp. IS1-09-1 to IS1-09-7.

S. Shigemi et al. "The Real-time Type Classification Architecture for Colorectal Endoscopic Images with NBI Magnification" (Nov. 1, 2013), vol. 113. No. 282, pp. 31 to 36. English counterpart: "FPGA Implementation of Type Identifier for Colorectal Endoscopic Images with NBI Magnification."

* cited by examiner

Type A　　　　　　Type B　　　　　　Type C3

Type A  Type B  Type C3

ENDOSCOPIC IMAGE DIAGNOSIS SUPPORT SYSTEM FOR COMPUTING AVERAGE VALUES OF IDENTIFICATION PROBABILITIES OF PATHOLOGICAL TYPES

TECHNICAL FIELD

The present disclosure relates to an endoscopic image diagnosis support system that identifies a pathological type in an identification target region in an endoscopic image, and more particularly to a technology for improving the identification precision.

BACKGROUND ART

In recent years, with the advance of the endoscopy technology, a variety of image diagnosis apparatuses are being developed. At present, in the image enhanced endoscopy (IEE) using magnifying endoscopic observation, optical digital methods, such as narrow band imaging (NBI) and blue laser imaging (BLI), and digital methods are being discussed, where their clinical significances as screening and qualitative diagnosis of tumors have been gradually becoming evident. While many physicians are conducting gastrointestinal endoscopic examinations, the diagnoses thereof sometimes depend on the sensibility and experience of the examiners. This raises the necessity of a computer-aided diagnosis (CAD) system that evaluates a symptom quantitatively to support the diagnosis by a physician as a "second opinion."

In the past years, the present inventors have developed a method of analyzing spectral images (NBI images) strongly relevant to pathological tissue diagnosis from magnified colorectal endoscopic images and setting diagnosis criteria suitable for the computerized diagnosis support CAD, and developed an image recognition system (i.e., endoscopic image diagnosis support system) that can present quantitative numerals strongly relevant to the pathological tissue diagnosis. This system, using a technique called bag-of-features (BoF) or bag-of-keypoints, transforms a local feature value extracted from an image of a recognition target region (hereinafter also referred to as a scan window (SW)) in an endoscopic image to a histogram of visual words (VW), and performs image matching (i.e., feature value matching) with learning images pre-classified into pathological types (i.e., each of learning images is represented as a feature value of a histogram of visual words), thereby computing the identification probabilities of the pathological types in the identification target region.

Further, the inventors have succeeded in hardware implementation of the feature value extraction processing from an image of an identification target region and the pathologic determination (i.e., identification) processing, which are otherwise especially high in computation cost in the system, thereby permitting processing of a full HD (i.e., 1920×1080 pixels) or higher quality endoscopic image in real time with high identification precision (see Non-Patent Documents 1 and 2, for example).

CITATION LIST

Non-Patent Document

NON-PATENT DOCUMENT 1: T. Mishima, S. Shigemi, A. T. Hoang, T. Koide, T. Tamaki, B. Raytchev, K. Kaneda, Y. Kominami, R. Miyaki, T. Matsuo, S. Yoshida and S. Tanaka, "Development of feature extraction architecture for computer-aided diagnosis system for colorectal endoscopic images with NBI magnification," The 15th IEEE Hiroshima Student Symposium (HISS), Nov. 16-17, 2013, p. B84-1-B84-4

NON-PATENT DOCUMENT 2: S. Shigemi, T. Mishima, A. T. Hoang, T. Koide, T. Tamaki, B. Raytchev, K. Kaneda, Y. Kominami, R. Miyaki, T. Matsuo, S. Yoshida and S. Tanaka, "Development of type identification architecture for computer-aided diagnosis system for colorectal endoscopic images with NBI magnification," The 15th IEEE Hiroshima Student Symposium (HISS), Nov. 16-17, 2013, p. B79-1-B79-4

SUMMARY OF THE INVENTION

Technical Problem

In the conventional endoscopic image diagnosis support system, the entire full HD endoscopic image has been scanned with scan windows (SW) (e.g., regions having a size of 120×120 pixels) to determine pathological types in the scan windows. However, the actual affected area projected in the endoscopic image is not rectangular in many cases. When a plurality of pathological types exist in one scan window, therefore, the identification probabilities of these pathological types may compete with each other, making it difficult to determine the pathological type in the scan window. To solve this problem, the size of the scan windows may be reduced. In this case, however, since the feature value extracted from the image of one scan window will decrease, the identification precision may possibly be degraded. Moreover, with decrease of the scan window size, the number of times of scanning of the entire full HD (i.e., 1920×1080 pixels) endoscopic image will increase, reducing the processing speed and increasing the time required until the processed results are displayed (latency), resulting in difficulty in real-time display.

In view of the above-described problem, an objective of the present disclosure is improving the identification precision in an endoscopic image diagnosis support system that identifies the pathological type in an identification target region in an endoscopic image.

Solution to the Problem

The endoscopic image diagnosis support system according to an aspect of the disclosure includes: a memory that stores learning images pre-classified into pathological types; and a processor that, given an endoscopic image, performs feature value matching between an image of an identification target region in the endoscopic image and the learning images, to identify the pathological types in the identification target region, wherein the processor performs feature value matching between the image of the identification target region and the learning images to compute identification probabilities of the pathological types in the identification target region, and, when a maximum value of the identification probabilities is smaller than a threshold, subdivides the identification target region, to perform feature value matching between images of subdivided regions and the learning images to compute identification probabilities of the pathological types in the subdivided regions, and computes average values of the identification probabilities of the pathological types in the identification target region and the subdivided regions, the average values corresponding to identification probabilities of the pathological types in hierarchical overlap regions of the identification target region and the subdivided regions.

The endoscopic image diagnosis support system according to another aspect of the disclosure includes: a memory that stores learning images pre-classified into pathological types; and a processor that, given an endoscopic image, performs feature value matching between an image of an identification target region in the endoscopic image and the learning images, to identify the pathological types in the identification target region, wherein the processor performs feature value matching between images of the identification target region and subdivided regions of the identification target region and the learning images to compute identification probabilities of the pathological types in the identification target region and the subdivided regions, and computes average values of the identification probabilities of the pathological types in the identification target region and the subdivided regions, the average values corresponding to identification probabilities of the pathological types in hierarchical overlap regions of the identification target region and the subdivided regions.

According to the above configurations, the identification probabilities of the pathological types are computed in hierarchical overlap regions having various sizes in an endoscopic image, and are averaged, permitting identification of a pathological type of an affected area having a complicated shape.

The processor may compute the average values by performing weighting for the identification probabilities of the pathological types in the identification target region and the subdivided regions according to region size-specific identification precision. According to this, the identification precision can be further improved.

The feature values obtained from the images of the identification target region and the subdivided regions may be represented by histograms of visual words based on a bag-of-features technique, and the processor may compute a histogram representing a feature value obtained from an image of a high-level region by addition of a histogram representing a feature value obtained from an image of a low-level region hierarchically overlapping the high-level region. According to this, the processing of producing a histogram representing the feature value obtained from an image of a high-level region becomes easy, and thus, with reduction in computation amount, the processing speed can be improved.

The processor may perform one-versus-multi two-class identification for the pathological types, and compute the identification probabilities of the pathological types in the identification target region and the subdivided regions based on the identification results of the two-class identification. According to this, the identification precision can be improved.

Advantages of the Invention

According to the disclosure, the identification precision can be improved in an endoscopic image diagnosis support system that identifies the pathological type in an identification target region in an endoscopic image.

DESCRIPTION OF EMBODIMENTS

A form for carrying out the present disclosure will be described hereinafter with reference to the accompanying drawings. Note that, in the following description, an NBI magnified colorectal endoscopic image is used as the endoscopic image and the classification of NBI magnification observation findings (especially, three types of Type A, Type B, and Type C3) in Hiroshima University Hospital is used as the pathological types, for convenience. It should however be understood that the disclosure is not limited to the embodiment to follow, but is also applicable to diagnosis support systems using gastrointestinal endoscopic images, for example.

Figure 1:
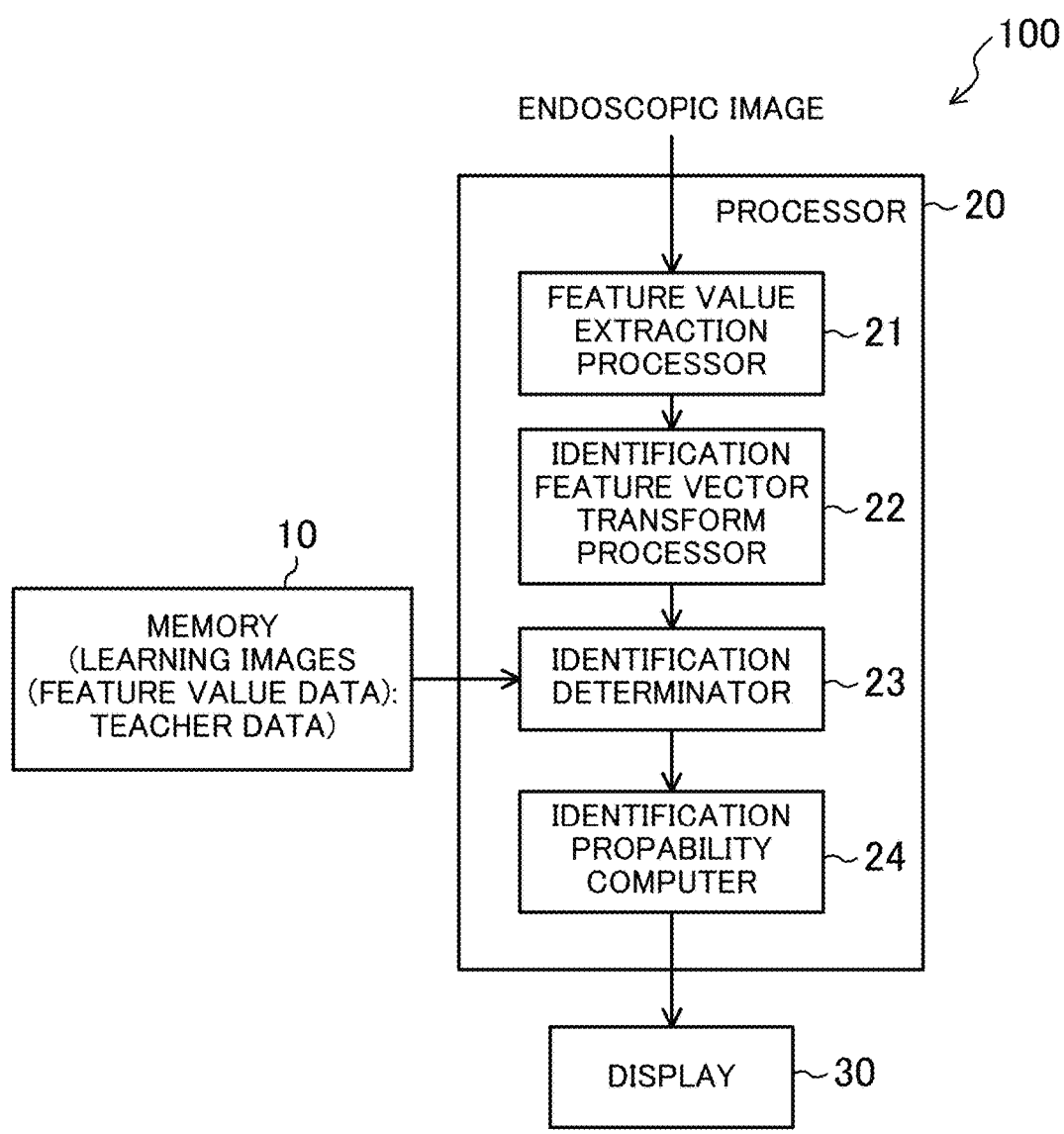
FIG. 1 is a schematic block diagram of an endoscopic image diagnosis support system according to an embodiment of the disclosure.

FIG. 1 shows a schematic configuration of an endoscopic image diagnosis support system according to an embodiment of the disclosure (hereinafter simply referred to as "the system"). The system 100 supports endoscopic diagnosis by a physician, and also assists the education of less-experienced physicians, by identifying the pathological type of an affected area projected in an NBI magnified colorectal endoscopic image on the basis of objective indicators.

Specifically, the system 100 includes a memory 10, a processor 20, and a display 30. The memory 10 is constituted by a nonvolatile memory such as a flash memory, a hard disk drive, etc. The processor 20 is constituted by various types of hardware such as a central processing unit (CPU), a field programmable gate array (FPGA), and a graphics processing unit (GPU). The display 30 is constituted by a cathode ray tube (CRT), a liquid crystal display (LCD), etc.

The processor 20 receives an endoscopic image and determines the pathological type in an identification target region (i.e., scan window SW) in the endoscopic image. The determination results are represented as the probability (i.e., identification probability) for each pathological type, for example, and shown on the display 30 in real time together with the endoscopic image, or on another screen.

The endoscopic image input into the processor 20 may be a real-time video image from an endoscopic camera during the examination or a visual image shot and stored in a past examination. In the former case, real-time determination of the pathological type of the affected area can be performed during the examination. In the latter case, education and training of the endoscopic examination can be performed with the help of an enormous amount of past archive visual images.

The processor 20 includes a feature value extraction processor 21, an identification feature vector transform processor 22, an identification determinator 23, and an identification probability computer 24. Out of these modules, the feature value extraction processor 21 and the identification determinator 23 have been successfully implemented as hardware (see Non-Patent Documents 1 and 2). The remaining identification feature vector transform processor 22 and identification probability computer 24 can also be implemented as hardware, or may be processed by software by a CPU, etc. not shown in the processor 20.

The feature value extraction processor 21 extracts a local feature value from an image of a scan window in an endoscopic image. Here, as a local feature descriptor, dense scale-invariant feature transform (D-SIFT), for example, can be used.

In D-SIFT, feature points (i.e., keypoints) are given in a grid on the input image, and gradient information of brightness values in a local region around each feature point is transformed to a parameter (i.e., feature value) of 128 dimensions. First, the feature value extraction processor 21 performs smoothing with a Gaussian filter and determines brightness gradients in the x and y directions for each pixel. The feature value extraction processor 21 then classifies the gradient directions of the pixels into eight directions using the determined brightness gradients, and computes the gradient strengths. Thereafter, the feature value extraction processor 21 performs convolution for each of blocks obtained by dividing the local region into 4×4=16 and for each direction (i.e., eight directions), and further performs weighting based on the Gaussian function for each block according to the distance from the feature point. The thus-obtained value of 4×4×8 directions=128 dimensions is normalized, to obtain 128 dimensional feature vectors.

Note that, as disclosed in Non-Patent Document 1, by omitting the weighting for the blocks according to the distance from the feature point, it is possible to share the values of all blocks in overlapping feature value description regions. This can largely reduce the required memory amount. Further, as disclosed in the aforementioned document, by achieving computation of the brightness gradient directions of the pixels without use of arctan function, by reducing the brightness gradient directions to four directions, and by changing the normalization processing to threshold processing, software and hardware implementation of the D-SIFT algorithm will be facilitated. This will largely increase the speed of the feature value extraction processing.

The identification feature vector transform processor 22 transforms the feature vectors extracted by the feature value extraction processor 21 to a histogram of visual words (VW) based on the bag-of-features (BoF) technique.

The visual words are obtained by performing clustering of feature vectors extracted from learning images. More specifically, feature vectors are extracted from learning images pre-specified as Type A, and performs clustering of the feature vectors into a plurality of (e.g., 256) clusters by a k-means method, etc. The centers of the clusters are visual words. In other words, a plurality of (e.g., 256) visual words featuring Type A are obtained from the learning images pre-classified as Type A. Similarly, a plurality of (e.g., 256) visual words featuring Type B are obtained from learning images pre-classified as Type B, and a plurality of (e.g., 256) visual words featuring Type C3 are obtained from learning images pre-classified as Type C3.

The identification feature vector transform processor 22 finds one, out of the above-described three sets of 256 visual words, most similar to a feature vector extracted by the feature value extraction processor 21, i.e., one smallest in inter-vector distance, and votes once for each of the three sets of visual words. This voting processing is performed for the feature vectors extracted by the feature value extraction processor 21, whereby the feature vectors are transformed to a histogram of 768 (=256×3) visual words. In other words, the image of a scan window in the endoscopic image is represented by feature vectors in the 768 dimensional identification space.

Another method may be used to produce visual words using feature vectors previously extracted from the learning images. Also, the number of dimensions of the visual words can be changed.

The memory 10 stores learning images pre-classified into pathological types. The learning images stored in the memory 10 are also represented by a histogram of 768 visual words, i.e., feature vectors in the 768 dimensional identification space.

The identification determinator 23 identifies which pathological type, Type A, Type B, or Type C3, the histogram of visual words produced by the identification feature vector transform processor 22 belongs to, using the learning images stored in the memory 10 as teacher data. A support vector machine (SVM), for example, can be used as an identifier.

As disclosed in Non-Patent Document 2, there are one-versus-one approach and two-stage determination as multi-class identification based on the SVM that is a two-class identifier. For example, in the one-versus-one approach, an identifier "A vs B" that identifies Type A from Type B, an identifier "B vs C3" that identifies Type B from Type C3, and an identifier "C3 vs A" that identifies Type C3 from Type A are placed in parallel, whereby the final identification result can be obtained based on the identification results of the identifiers.

Figure 2:
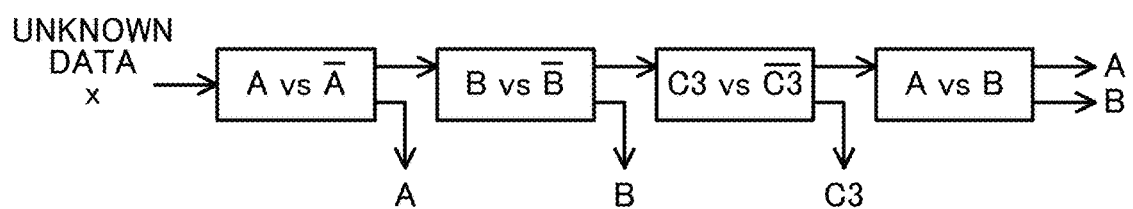
FIG. 2 is a conceptual view of cascade identification.

As another approach, identification using cascading of identifiers each performing one-versus-multi two-class identification for each pathological type (hereinafter referred to as cascade identification) is also possible. FIG. 2 is a conceptual view of the cascade identification. As shown in FIG. 2, an identifier "A vs ¬A" that identifies Type A from the other, an identifier "B vs ¬B" that identifies Type B from the other, and an identifier "C3 vs ¬C3" that identifies Type C3 from the other are cascaded, whereby the final identification result can be obtained based on the identification results of the identifiers.

An identifier "A vs B" that identifies Type A from Type B may further be connected at the stage following the identifier "C3 vs ¬C3." This is for giving unknown data x that should be classified as Type A a change of being classified as Type A again when this data has been classified as ¬A by the first-stage identifier "A vs ¬A." This is effective when the precision of the identifier "A vs ¬A" is not 100%. With this connection of the identifier "A vs B" at the final stage, the identification precision of the identification determinator 23 can be improved.

The endoscopic image input into the processor 20 may have blown out highlights of the image due to lighting, disturbance of the image associated with cleaning with water, pulsation caused by blood vessels on the large intestine wall, blurring of the image during the operation of the endoscope, etc. Since the pathological type of such a blurring image may not be correctly identified with high probability, a two-class identifier that distinguishes a blurring image from the other may be connected at the initial stage of the above-described cascade identification.

Figure 3:
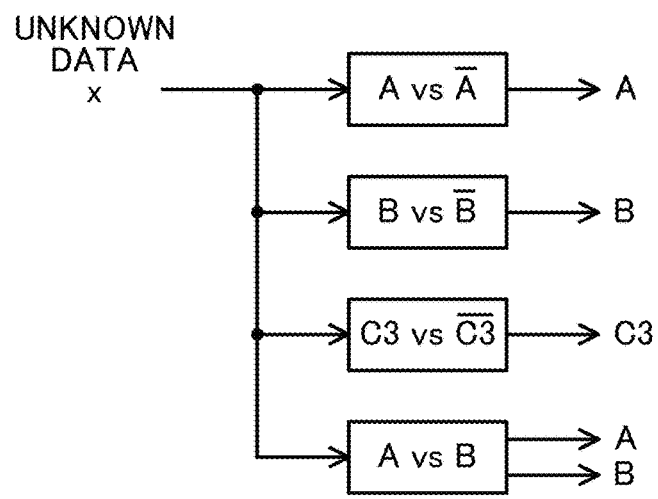
FIG. 3 is a view showing an architecture example in hardware implementation of the cascade identification.

The above-described cascade identification can be implemented by either software processing or hardware processing. FIG. 3 shows an architecture example of hardware implementation of the cascade identification. In the hardware processing of the cascade identification, the identifiers are placed in parallel, whereby the final identification result can be obtained based on the identification results of the identifiers.

Referring back to FIG. 1, the identification probability computer 24 receives the identification results of the identifiers in the identification determinator 23, and computes the identification probability of each pathological type by a steepest descent method, for example.

As described above, the processor 20 receives an endoscopic image and performs image matching (i.e., feature value matching) between images of scan windows in the endoscopic image and the learning images, to identify the pathological types in the scan windows.

Moreover, the processor 20 hierarchically subdivides the scan windows, to permit identification of the pathological type of an affected area having a complicated shape, not a rectangular shape.

Figure 4:
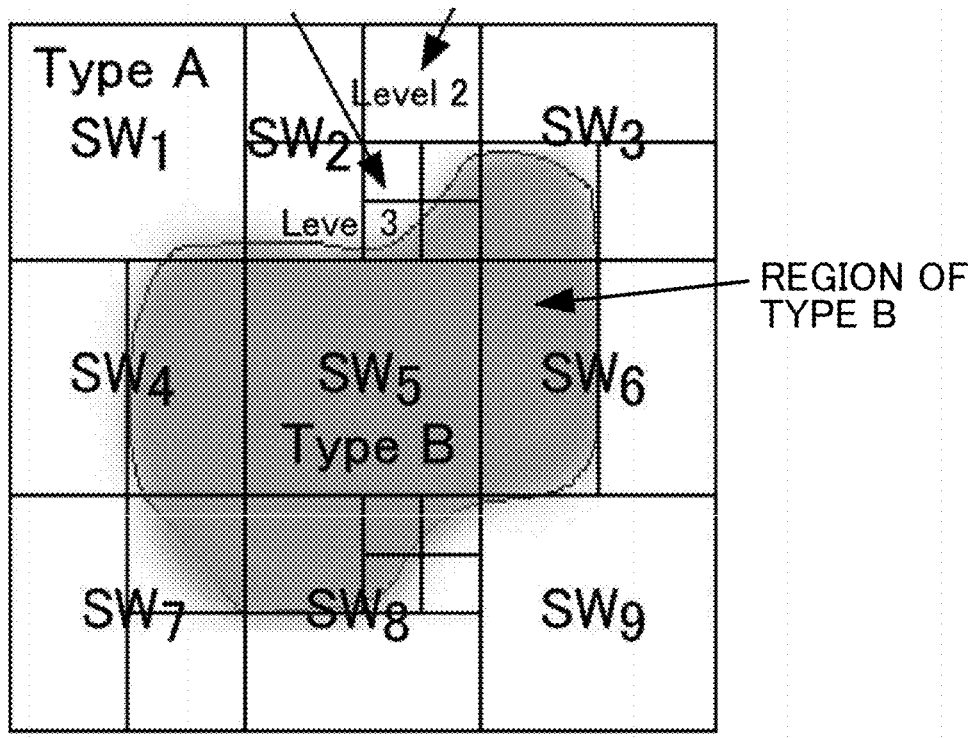
FIG. 4 is a view for explaining hierarchical subdivision of identification target regions (i.e., scan windows SW).

FIG. 4 is a view for explaining the hierarchical subdivision of scan windows. As shown in FIG. 4, for example, scan windows $SW_1$ to $SW_9$ in an endoscopic image are subjected to processing to compute the identification probabilities of the pathological types. In the illustrated example, since Type A occupies roughly the entire regions in the scan windows $SW_1$ and $SW_9$, the identification probability of Type A is very high in these scan windows. Likewise, since Type B occupies roughly the entire region in the scan window $SW_5$, the identification probability of Type B is very high in this scan window. In the other scan windows, where both Type A and Type B are present, the determination whether the pathological type is Type A or Type B is difficult. To solve this problem, such scan windows are hierarchically subdivided to produce smaller-sized scan windows at a lower hierarchical level (e.g., Level 2) and further smaller-sized scan windows at a further lower hierarchical level (e.g., Level 3), to identify the pathological types in such small-sized scan windows (hereinafter referred to as hierarchical identification). Note that, in the following description, the "level" refers to the hierarchical level of the scan windows SW.

For the hierarchical identification, there are two approaches: a top-down approach and a bottom-up approach. Each of these approaches will be described hereinafter.

Figure 5:
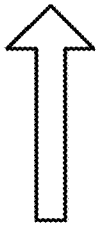
FIG. 5 is a view showing an example of top-down hierarchical identification.

FIG. 5 shows an example of top-down hierarchical identification. In the top-down hierarchical identification, first, the endoscopic image is scanned for large-sized scan windows, i.e., the highest-level scan windows, to perform identification processing in each scan window. The left side of FIG. 5 shows the results of the identification processing performed for scan windows $SW_{1,1}$ to $SW_{9,1}$ into which the endoscopic image has been divided. Note that the right-side number of the subscript of each SW represents the level of the scan window (assuming that the highest level is Level 1), and the left-side number represents the serial number of the scan window at this level. This also applies to the following description. In the example of FIG. 5, the identification probability of Type A is 90% in the scan windows $SW_{1,1}$ to $SW_{4,1}$ and $SW_{6,1}$ to $SW_{9,1}$. It can therefore be determined that the pathological type in these scan windows is Type A.

In the scan window $SW_{5,1}$, however, the identification probabilities of three pathological types compete with one another. It is therefore difficult to determine the pathological type in the scan window $SW_{5,1}$.

When it is difficult to determine which pathological type a scan window belongs to, like the scan window $SW_{5,1}$, more specifically when the maximum value of the identification probabilities is smaller than a threshold (e.g., 80 to 90%), the processor 20 subdivides the scan window in question to perform identification processing for low-level scan windows, i.e., smaller-sized scan windows.

For example, as shown on the right side of FIG. 5, the scan window $SW_{5,1}$ where three pathological types compete with one another is subdivided into four, to perform the identification processing for smaller scan windows $SW_{1,2}$ to $SW_{4,2}$. In this way, by subdividing a scan window, the pathological type of an affected area having a complicated shape, not a rectangular shape, can be identified more precisely.

Note that while the scan window $SW_{5,1}$ is subdivided into scan windows $SW_{1,2}$ to $SW_{4,2}$ the regions of which do not overlap one another in the example of FIG. 5, the regions of the subdivided scan windows may overlap one another.

The above-described top-down identification processing is suitable for software processing, in particular, in its sequential processing of subdividing a scan window when the maximum value of the identification probabilities is smaller than a threshold. Also, since the identification processing is performed, not for small-sized scan windows over the entire endoscopic image, but for smaller-sized scan windows only when necessary (when the maximum value of the identification probabilities is smaller than a threshold), the entire full HD (i.e., 1920×1080 pixels) endoscopic image can be processed at high speed.

Figure 6:
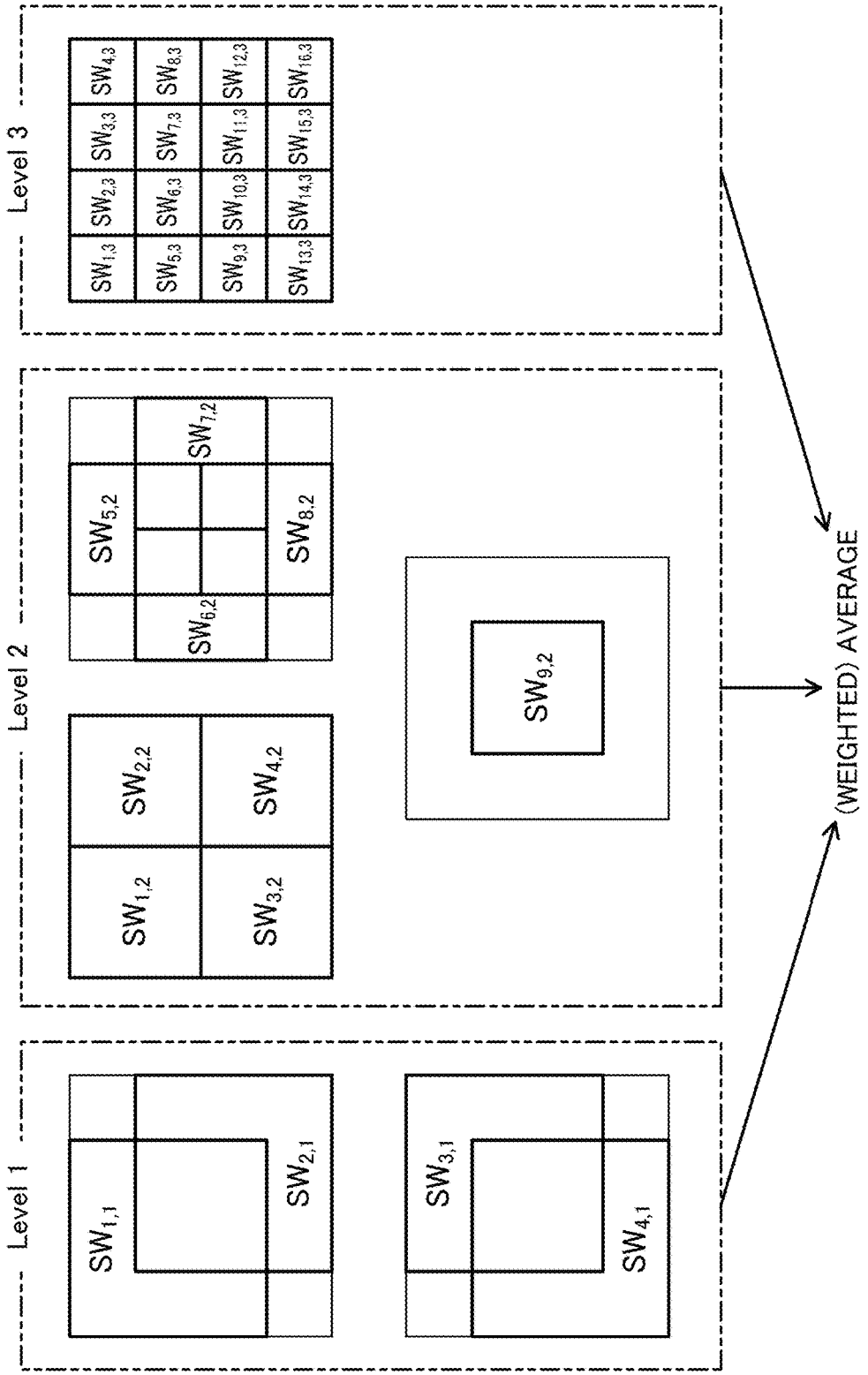
FIG. 6 is a view showing an example of bottom-up hierarchical identification.

FIG. 6 shows an example of bottom-up hierarchical identification. In the bottom-up hierarchical identification, the identification processing is performed for various-sized scan windows. For example, in the example of FIG. 6, large (Level 1), middle (Level 2), and small (Level 3) sized scan windows are used to perform the identification processing. The regions of the scan windows may overlap partially or entirely one another, not only between different levels but also within the same level.

In the bottom-up hierarchical identification, the histogram of visual words obtained from the feature value of an image of a high-level scan window can be computed by weighted addition of histograms obtained from the feature values of images of low-level scan windows. As described above, by omitting the weighting for the blocks according to the distance from the feature point in the feature value extraction processor 21, the histogram representing the feature value obtained from an image of a high-level scan window can be produced by simply adding histograms representing the feature values obtained from images of low-level scan windows and normalizing the results. In other words, it is only necessary to produce histograms of visual words for scan windows at the lowest level (Level 3 in the example of FIG. 6): histograms of higher-level scan windows can be easily computed from the histograms of the lowest-level scan windows. Also, the feature value computation for the lowest-level scan windows can be made by parallel processing. Considering these aspects, the bottom-up identification processing is suitable for hardware processing where parallel processing is especially easy.

In either of the top-down hierarchical identification and the bottom-up hierarchical identification, the identification probabilities of the pathological types in a hierarchical overlap region of scan windows are computed as average values of the identification probabilities of the pathological types in the scan windows in the overlap region. In the example of FIG. 5, the processor 20 computes the average values of the identification probabilities of the pathological types in the scan window $SW_{1,2}$ and its higher-level scan window $SW_{5,1}$. In the example of FIG. 6, the processor 20 computes the average values of the identification probabilities of the pathological types in the scan window $SW_{6,3}$, its higher-level scan windows $SW_{1,2}$, $SW_{5,2}$, $SW_{6,2}$, and $SW_{9,2}$, and its further higher-level scan windows $SW_{1,1}$ to $SW_{4,1}$.

Figure 7:
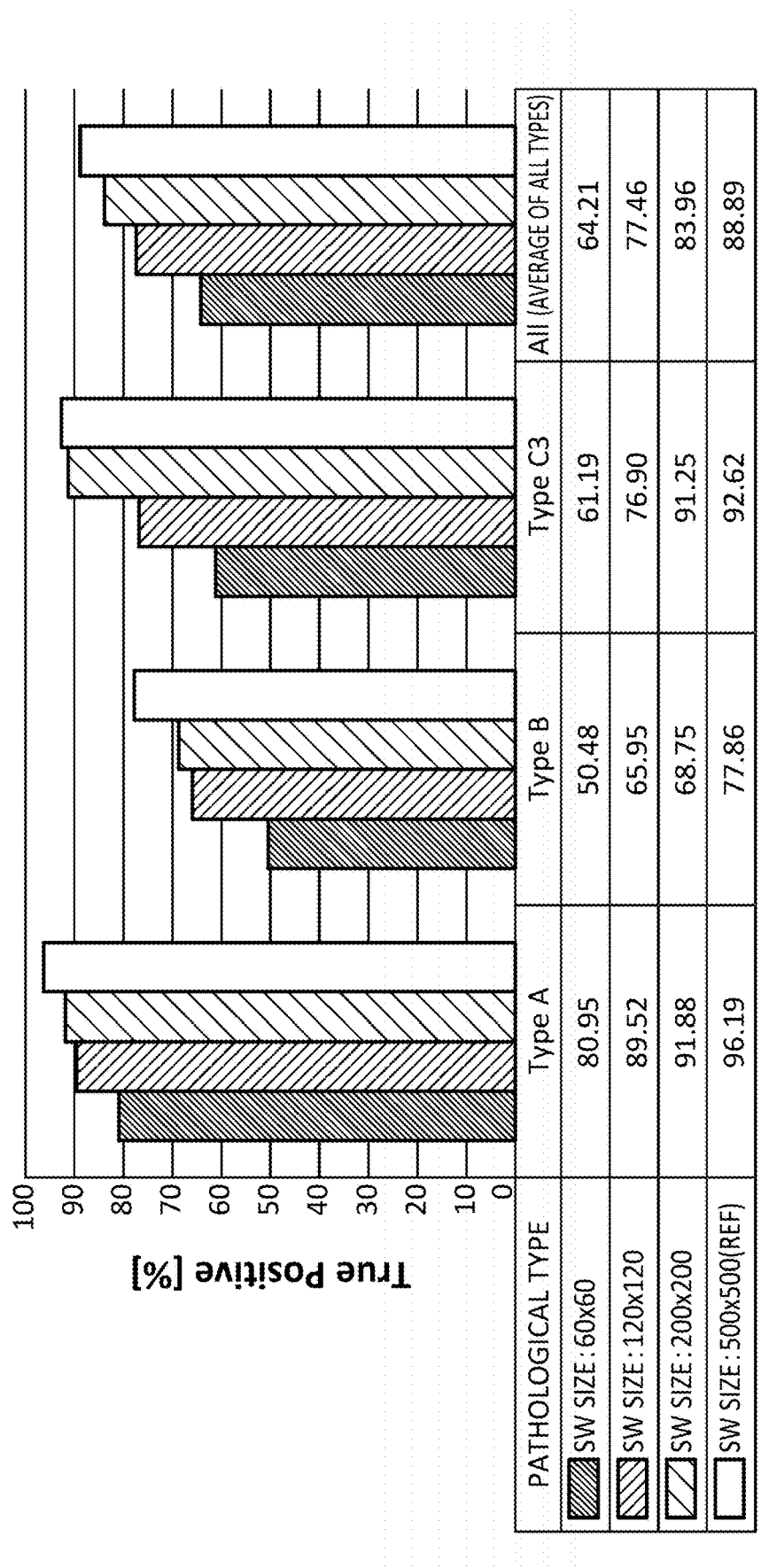
FIG. 7 is a graph showing examples of identification precision (i.e., true positive) by pathological type and by scan window size.

FIG. 7 is a graph showing examples of identification precision (i.e., true positive) given by pathological type (e.g., Type A, Type B, Type C3, and the average of all types (All)) and by scan window size (e.g., 60×60 pixels, 120×120 pixels, 200×200 pixels, and 500×500 pixels). The true positive(i) where i is any one of Type A, Type B, Type C3, and All is defined by the following equation.

True positive$(i)$=Posi_Num$(i)$/Img_Num$(i)$*100[%]

where Img_Num(i) is the total number of input image data units for Type i, and Posi_Num(i) is the number of data units, among the total input image data units, correctly identified as Type i.

As shown in FIG. 7, in any of the pathological types, the identification precision (i.e., true positive) decreases with decrease in the size of the scan window. In consideration of this, when computing the average values of the identification probabilities of the pathological types in the scan windows, the processor 20 may provide weighting according to the scan window size-dependent identification precision. This can improve the identification precision.

As described above, according to this embodiment, the pathological type of an affected area having a complicated shape, not a rectangular shape, can be identified at high speed with high precision.

The scan windows are not necessarily rectangular but may have various shapes. Also, the sizes of the scan windows are arbitrary.

EXAMPLES

Examples of analysis of endoscopic images by the bottom-up hierarchical identification performed using the endoscopic image diagnosis support system 100 according to the embodiment will be described hereinafter.

Figure 8A:
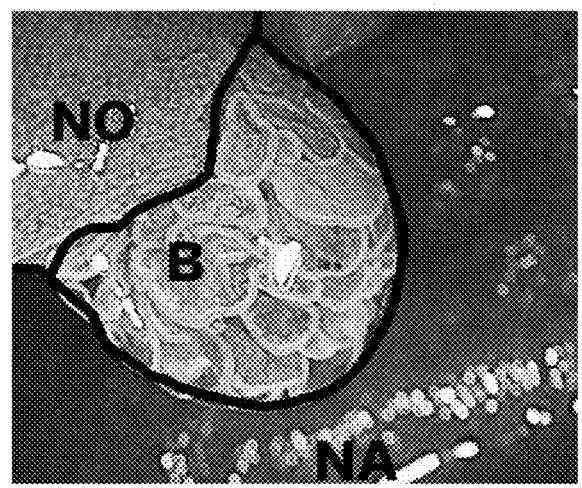
FIG. 8A shows an endoscopic image according to one example.
Figure 9A:
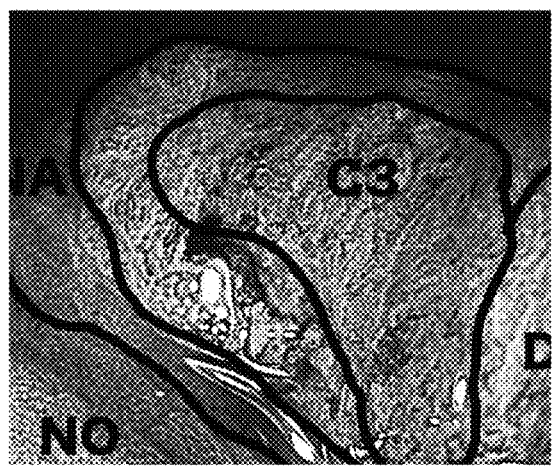
FIG. 9A shows an endoscopic image according to another example.

FIG. 8A shows an endoscopic image according to one example. This endoscopic image has an affected area of Type B having a contour made of a curved line and a slant line in a center portion. FIG. 9A shows an endoscopic image according to another example. This endoscopic image has an affected area of Type C3 having a curved contour extending from a center portion to a lower right portion.

Figure 8B:
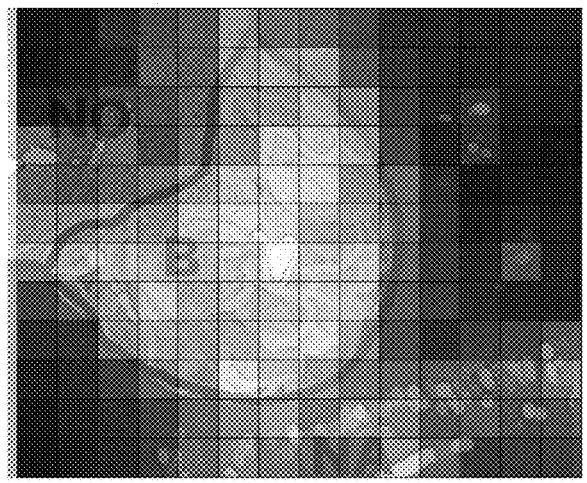
FIG. 8B is a view showing the results of analysis of the endoscopic image shown in FIG. 8A by the bottom-up hierarchical identification.
Figure 9B:
FIG. 9B is a view showing the results of analysis of the endoscopic image shown in FIG. 9A by the bottom-up hierarchical identification.
Figure 9B:
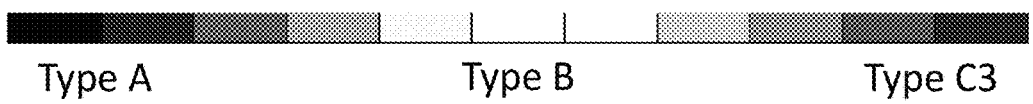

FIG. 8B is a view showing the results of analysis of the endoscopic image shown in FIG. 8A by the bottom-up hierarchical identification. FIG. 9B is a view showing the results of analysis of the endoscopic image shown in FIG. 9A by the bottom-up hierarchical identification. Note that the squares of the grid in both figures indicate the lowest-level scan windows in the bottom-up hierarchical identification, i.e., the finest identification target regions, each having a size of 60×60 pixels.

According to the analysis results shown in FIG. 8B, the identification probability of Type B was computed to be high in scan windows corresponding to the affected area of Type B, indicating that the affected area of Type B in the endoscopic image shown in FIG. 8A could be correctively identified.

According to the analysis results shown in FIG. 9B, the identification probability of Type C3 was computed to be high in scan windows corresponding to the affected area of Type C3, indicating that the affected area of Type C3 in the endoscopic image shown in FIG. 9A could be correctively identified.

While a specific embodiment and examples of the present disclosure have been described, it is understood that the disclosure is not limited to the configuration of the above-described embodiment, but various modifications are possible.

The configuration shown according to the above embodiment is only illustrative and by no means intended to limit the disclosure.

The invention claimed is:

1. An endoscopic image diagnosis support system, comprising:
    a memory that stores learning images pre-classified into pathological types; and
    a processor that, given an endoscopic image, performs feature value matching between an image of an identification target scan window in the endoscopic image and the learning images, to identify the pathological types in the identification target scan window,
    wherein the processor performs feature value matching between the image of the identification target scan window and the learning images to compute identification probabilities of the pathological types in the identification target scan window, and, when a maximum value of the identification probabilities is smaller than a threshold, subdivides the identification target scan window, to perform feature value matching between images of subdivided scan windows and the learning images to compute identification probabilities of the pathological types in the subdivided scan windows, and computes average values of the identification probabilities of the pathological types in the identification target scan window and the subdivided scan windows, the average values corresponding to identification probabilities of the pathological types in hierarchical overlap regions of the identification target scan window and the subdivided scan windows,
    wherein the processor is configured to output the average values.

2. An endoscopic image diagnosis support system, comprising:
    a memory that stores learning images pre-classified into pathological types; and
    a processor that, given an endoscopic image, performs feature value matching between an image of an identification target scan window in the endoscopic image and the learning images, to identify the pathological types in the identification target scan window,
    wherein the processor performs feature value matching between images of the identification target scan window and subdivided scan windows of the identification target scan window and the learning images to compute identification probabilities of the pathological types in the identification target scan window and the subdivided scan windows, and computes average values of the identification probabilities of the pathological types in the identification target scan window and the subdivided scan windows, the average values corresponding to identification probabilities of the pathological types in hierarchical overlap regions of the identification target scan window and the subdivided scan windows,
wherein the processor is configured to output the average values.

3. The endoscopic image diagnosis support system of claim 1, wherein
the processor computes the average values by performing weighting for the identification probabilities of the pathological types in the identification target scan window and the subdivided scan windows according to scan window size-specific identification precision.

4. The endoscopic image diagnosis support system of claim 2, wherein
the processor computes the average values by performing weighting for the identification probabilities of the pathological types in the identification target scan window and the subdivided scan windows according to scan window size-specific identification precision.

5. The endoscopic image diagnosis support system of claim 1, wherein
the feature values obtained from the images of the identification target scan window and the subdivided scan windows are represented by histograms of visual words based on a bag-of-features technique, and
the processor computes a histogram representing a feature value obtained from an image of a high-level scan window by addition of a histogram representing a feature value obtained from an image of a low-level scan window hierarchically overlapping the high-level scan window.

6. The endoscopic image diagnosis support system of claim 2, wherein
the feature values obtained from the images of the identification target scan window and the subdivided scan windows are represented by histograms of visual words based on a bag-of-features technique, and
the processor computes a histogram representing a feature value obtained from an image of a high-level scan window by addition of a histogram representing a feature value obtained from an image of a low-level scan window hierarchically overlapping the high-level scan window.

7. The endoscopic image diagnosis support system of claim 1, wherein
the processor performs one-versus-multi two-class identification for the pathological types, and computes the identification probabilities of the pathological types in the identification target scan window and the subdivided scan windows based on identification results of the two-class identification.

8. The endoscopic image diagnosis support system of claim 2, wherein
the processor performs one-versus-multi two-class identification for the pathological types, and computes the identification probabilities of the pathological types in the identification target scan window and the subdivided scan windows based on identification results of the two-class identification.

9. The endoscopic image diagnosis support system of claim 1, wherein the processor is configured to determine the pathological types.

10. The endoscopic image diagnosis support system of claim 2, wherein the processor is configured to determine the pathological types.

11. The endoscopic image diagnosis support system of claim 1, further comprising a display, wherein the output is to the display.

12. The endoscopic image diagnosis support system of claim 2, further comprising a display, wherein the output is to the display.

13. The endoscopic image diagnosis support system of claim 11, wherein the processor is configured to show the probability of each pathological type on the display.

14. The endoscopic image diagnosis support system of claim 12, wherein the processor is configured to show the probability of each pathological type on the display.

15. The endoscopic image diagnosis support system of claim 13, wherein the processor is configured to show on the display the probability for each pathological type in real time.

16. The endoscopic image diagnosis support system of claim 14, wherein the processor is configured to show on the display the probability for each pathological type in real time.

17. The endoscopic image diagnosis support system of claim 15, wherein the processor is configured to show on the display or another screen the endoscopic image.

18. The endoscopic image diagnosis support system of claim 16, wherein the processor is configured to show on the display or another screen the endoscopic image.

19. The endoscopic image diagnosis support system of claim 17, wherein the endoscopic image is a real-time video image.

20. The endoscopic image diagnosis support system of claim 18, wherein the endoscopic image is a real-time video image.

* * * * *